United States Patent [19]

Ishiwaka et al.

[11] Patent Number: 5,093,378

[45] Date of Patent: Mar. 3, 1992

[54] PROCESS FOR PRODUCING FLEXIBLE POLYURETHANE FOAM

[75] Inventors: Takumi Ishiwaka, Yokohama; Hajime Hasegawa, Chigasaki; Takashi Ohashi, Yokohama, all of Japan

[73] Assignee: Bridgestone Corporation, Tokyo, Japan

[21] Appl. No.: 370,258

[22] Filed: Jun. 22, 1989

[30] Foreign Application Priority Data

Jun. 24, 1988 [JP] Japan .................. 63-154636

[51] Int. Cl.$^5$ .................. C08G 18/54; C08G 18/32
[52] U.S. Cl. .................. 521/128; 521/158; 521/906
[58] Field of Search .................. 521/128, 158

[56] References Cited

U.S. PATENT DOCUMENTS

| | | | |
|---|---|---|---|
| 4,225,481 | 9/1980 | Wagner | 528/232 |
| 4,258,141 | 3/1981 | Jarre et al. | 521/114 |
| 4,275,169 | 6/1981 | Rudner et al. | 521/99 |
| 4,282,135 | 8/1981 | Wagner | 528/232 |
| 4,367,294 | 1/1983 | Hahn et al. | 521/158 |
| 4,383,100 | 5/1983 | Pechhold | 521/158 |
| 4,394,306 | 7/1983 | Ravey | 521/158 |
| 4,654,377 | 3/1987 | Möhring | 521/170 |
| 4,722,946 | 2/1988 | Hostettler | 521/158 |

FOREIGN PATENT DOCUMENTS

| | | |
|---|---|---|
| 0004618 | 10/1979 | European Pat. Off. |
| 2809084 | 9/1989 | Fed. Rep. of Germany |
| 2228804 | 12/1974 | France |
| 1462292 | 1/1977 | United Kingdom |
| 1585750 | 3/1981 | United Kingdom |
| 2163762 | 3/1986 | United Kingdom |
| 2177405 | 1/1987 | United Kingdom |

OTHER PUBLICATIONS

Woods; *The ICI Polyurethanes Book*; 1987, pp. 7–15.
Kirk–Othmer; *Concise Encyclopedia of Chemical Technology*; pp. 1211–1212.

*Primary Examiner*—Maurice J. Welsh
*Assistant Examiner*—Rabon Sergent
*Attorney, Agent, or Firm*—Birch, Stewart, Kolasch & Birch

[57] ABSTRACT

An improved process for producing a flexible polyurethane foam having improved flame retardance and physical properties by reacting a polyhydroxy compound and a polyisocyanate compound in the presence of a blowing agent, wherein the improvement comprises using as the polyhydroxy compound one in which an aldehyde condensation polymer has been formed by polycondensation and dispersed such that it accounts for preferably from 5 to 30 wt % of the total amount of the polyhydroxy compound, and adding as the flame retardant a melamine powder preferably in an amount of from 5 to 100 parts by weight for 100 parts by weight of said polyhydroxy compound.

14 Claims, No Drawings

PROCESS FOR PRODUCING FLEXIBLE POLYURETHANE FOAM

BACKGROUND OF THE INVENTION

1. Field of the Invention

The present invention relates to a process for producing a flexible polyurethane foam having improved flame retardance and physical properties.

2. Description of the Prior Art

Flexible polyurethane foams have long been in use in a great variety of application fields on account of their characteristic properties. A disadvantage of flexible polyurethane foams is that they have tendency to burn. Therefore, they are subject to regulations for flame retardance, and recently, the regulations are becoming more and more stringent. Rendering polyurethane foams flame retardancy is a very important technical subject.

There have been proposed many technologies for rendering polyurethane foams flame retardancy. Among the most popular, is the proposal of the incorporation of a phosphorus-containing halogen compound (such as tri (β-chloroethyl)phosphate and "Thermorin 101"), as the flame retardant. However, this method is appropriate only when the foam contains more than about 1 wt % of phosphorus. This means that it is necessary to add 10-30 parts by weight of expensive phosphorus/halogen-based flame retardant to 100 parts by weight of polyhydroxy compound. The resulting polyurethane foam is considerably more expensive as a matter of course. Another disadvantage of this method is that the phosphorus/halogen-based flame retardant exhibits a plasticizing effect, thereby adversely affecting the foam properties (e.g., lowering the hardness and tensile strength of foams and increasing the permanent set of foams). In addition, the flame retardant vaporizes and disappears with the lapse of time when foams are used at high temperatures. Not only does this lead to a decrease in flame-retardant performance but this also causes the contamination of nearby machines and equipment. Moreover, polyurethane foams incorporated with a phosphorus/halogen-based flame retardant corrode metals (such as iron and aluminum) in contact with them during use.

Rendering polyurethane foams flame retardant by incorporating these foams with a phosphorus- and halogen-containing compound as a flame retardant, presents many problems as mentioned above. Therefore, there has been a strong demand for the development of a new technology for improving the flame retardance of polyurethane foams.

SUMMARY OF THE INVENTION

Accordingly, it is an object of the present invention to provide a process for producing a flexible polyurethane foam having improved flame retardance and physical properties.

The present inventors previously disclosed in Japanese Patent Laid-open No. 106799/1978 that it is possible to render polyurethane foams flame retardant by incorporating these foams with a cheap melamine powder as a flame retardant. On the other hand, it was disclosed in Japanese Patent Publication Nos. 4851/1988 and 4852/1988 that it is possible to obtain a highly flame-retardant polyurethane foam from a polyhydroxy compound (polyol) containing an aldehyde condensation polymer (which is formed by the polycondensation and dispersion of an aldehyde condensation polymer in a polyol) or from a polyhydroxy compound (polyol) containing both the aldehyde condensation polymer and an addition polymer. The present inventors further continued their research to find that when a polyurethane foam produced from said polyol containing an aldehyde condensation polymer or an aldehyde condensation polymer and an addition polymer are incorporated with a melamine powder, the resulting foam is enhanced with a greater flame retardancy than the foam which is incorporated with a melamine powder alone. In addition, the resulting foam retains its physical properties almost to the point of being unchanged, unlike the foam produced only from the polyol containing an aldehyde condensation polymer or an aldehyde condensation polymer and an addition polymer. In this way, it is possible to produce a flexible polyurethane foam having improved flame retardance and physical properties at a low production cost. The present invention is based on this finding.

Therefore, according to the present invention, there is provided an improved process for producing a flexible polyurethane foam by reacting a polyhydroxy compound and a polyisocyanate compound in the presence of a blowing agent, wherein the improvement comprises using a polyhydroxy compound in which, an aldehyde condensation polymer has been formed by polycondensation and dispersed, such that it accounts for from 5 to 30% by weight of the total amount of the polyhydroxy compound, and adding as the flame retardant a melamine powder in an amount of from 5 to 100 parts by weight for 100 parts by weight of said polyhydroxy compound.

DETAILED DESCRIPTION OF THE INVENTION

According to the present invention, the process for producing a flexible polyurethane foam includes the steps of reacting a polyhydroxy compound (referred to as "polyol" hereinbelow) with a polyisocyanate in the presence of a blowing agent and incorporating the polyol with a melamine powder as a flame retardant, said polyol being one in which, an aldehyde condensation polymer has been formed by polycondensation and dispersed.

There is no particular restriction as to the starting polyol, it may be any one which has hitherto been employed in the manufacture of polyurethane foam. Examples of the starting polyol include saturated polyether polyols formed by adding an alkylene oxide (such as ethylene oxide and propylene oxide) to a polyhydric alcohol (such as glycerin, trimethylolpropane, and ethylene glycol) or a polyamine (such as ethylenediamine). Preferable among these is a polyol formed by adding ethylene oxide and/or propylene oxide to glycerin or trimethylolpropane. Other examples of the starting polyol include unsaturated polyols formed by adding an alkylene oxide and an unsaturated epoxide (such as allyl glycidyl ether) to said polyhydric alcohol or polyamine, and unsaturated polyether-ester polyols formed by reacting said polyether polyol with an unsaturated carboxylic acid and, if necessary, with an epoxide. The polyol may be any suitable substance including polyether polyols having a molecular weight in the range from 1000 to 10000, preferably from 3000 to 7000.

The polyol used in the present invention contains an aldehyde condensation polymer, which is formed by polycondensation and dispersed in the polyol. The aldehyde condensation polymer is obtained by reacting an aldehyde with a compound capable of polycondensation therewith. Examples of the aldehyde include formaldehyde, acetaldehyde, paraformaldehyde, glyoxal, and hexamethylenetetramine. Preferable among these are formaldehyde and formaldehyde derivatives (such as paraformaldehyde). The aldehyde should preferably be used in the form of aqueous solution or solvent solution. The compound capable of polycondensation with an aldehyde is not restricted, although polyamine compounds (such as urea, melamine, and benzoguanamine), aromatic amines (such as aniline, diaminobenzene, and diaminodiphenylmethane), and phenols (such as phenol, cresol, and resorcinol) are preferred. They may be used alone or in combination with one another. Preferable among these are urea, melamine, and benzoguanamine.

The aldehyde and the compound capable of polycondensation therewith should be reacted in the polyol such that the content of the aldehyde condensation polymer in the polyol is from 5 to 30 wt %, preferably from 5 to 20 wt %. If the content of the aldehyde condensation polymer in the polyol is less than 5 wt %, the resulting polyurethane foam is poor in flame retardance. With the content in excess of 30 wt %, polyurethane foam can not afford the good condition.

The aldehyde and the compound capable of polycondensation therewith may be replaced by an initial condensate formed by reacting formaldehyde with a compound capable of polycondensation therewith. Examples of the initial condensate include one having methylol group such as methylol urea, dimethyl urea, polymethylol melamine, partially alkyl-etherified polymethylol melamine, and one having a high degree of condensation such as novolak. The initial condensate may also be used by reacting in the polyol with an aldehyde or a compound capable of polycondensation therewith.

The polyol used in the present invention may contain an addition polymer in combination with the aldehyde polycondensate. The addition polymer may be polymerized and dispersed in the polyol by reacting a monomer capable of addition polymerization in the presence of a polymerization initiator in the polyol. Examples of the monomer capable of addition polymerization include vinyl monomers (such as acrylonitrile, styrene, acrylic ester, methacrylic ester, and vinyl halide), vinylidene monomers (such as vinylidene halide), and diene monomers such as divinyl benzene and butadiene. They may be used alone or in combination with one another. Preferable among these are acrylonitrile and styrene used alone or in combination. In the case in which the monomer capable of addition polymerization is polymerized in the polyol, a polymerization initiator is used in most cases. Examples of the polymerization initiator include azo compounds (such as azobisisobutyronitrile) and peroxide compounds (such as benzoyl peroxide), with the former being preferable.

In the case where the addition polymer is contained in the polyol, the content of the addition polymer should be from 5 to 30 wt % of the total amount of the polyol and the total content of the polymers (the aldehyde condensation polymer and the addition polymer) should be less than 50 wt % of the total amount of the polyol. If the total content of the polymers is more than 50 wt %, stable foam production would be difficult to achieve.

The polyol containing the aldehyde condensation polymer or the polyol containing the aldehyde condensation polymer and the addition polymer may be one which is disclosed in the above-mentioned Japanese Patent Official Gazettes.

The polyisocyanate that can be used in the present invention is not specifically limited. It includes, for example, aromatic isocyanates (such as tolylene diisocyanate, diphenylmethane diisocyanate, and naphthalene diisocyanate), alicyclic isocyanates (such as isophorone diisocyanate and hydrogenated tolylene diisocyanate), and aliphatic isocyanates (such as hexamethylene diisocyanate). The polyisocyanate should be used in an amount of from 0.95 to 1.2 equivalents, preferably from 1.0 to 1.1 equivalents for the polyol.

The blowing agent that can be used in the present invention includes, for example, water, carbon dioxide, trichloromonofluoromethane, methylene dichloride, and pentane. It is used in an ordinary amount, although the amount of the blowing agent may preferably be in the range so that the polyurethane foam has a density of from 0.01 to 0.10 gr/cm$^3$, preferably from 0.02 to 0.06 gr/cm$^3$.

It is desirable to add a catalyst for the reaction of the polyol and polyisocyanate compound. Examples of the catalyst include tertiary amines (such as triethylenediamine, N-alkylmorpholine, and diethylethanolamine) and metal-based catalysts (such as dibutyltin dilaurate, stannous octoate, and lead acetate). They may be used alone or in combination with one another. The amount of the catalyst may preferably be in the range so that the polyurethane foam has a density of from 0.01 to 0.10 gr/cm$^3$, preferably from 0.02 to 0.06 gr/cm$^3$.

The above-mentioned essential components (the polymer-containing polyol, polyisocyanate compound, blowing agent, and catalyst) may be used in combination with optional components such as surfactant (e.g. silicone surfactant), crosslinking agent, chain extender, filler, and stabilizers, which are commonly used for the production of polyurethane foams.

According to the present invention, the raw materials for polyurethane foam are incorporated with a melamine powder as a flame retardant in addition to the above-mentioned components (i.e., the polymer-containing polyol, polyisocyanate compound, blowing agent, catalyst, and optional additives). The combined use of the polymer-containing polyol and melamine powder provides a polyurethane foam having a high performance of flame retardance and a high level of hardness.

The melamine powder should be added in an amount of from 5 to 100 parts by weight, preferably from 10 to 50 parts by weight, for 100 parts by weight of the polyol. With an amount less than 5 parts by weight, the melamine powder does not render the polyurethane foam flame retardant. With an amount in excess of 100 parts by weight, the melamine powder impedes the stable foam production.

The melamine powder may be added in any manner. As much as necessary, may be added to the polymer-containing polyol to make a uniform premix. It may also be added to the polyisocyanate compound to make a suspension. Alternatively, it may be added separately along with other components at the time of a foam production.

In addition to the melamine powder, any other flame retardant may be added in an amount not harmful to the object of the present invention.

The above-mentioned polyurethane foam raw materials may be made into polyurethane foams by any process (such as a one-shot process and a prepolymer process) which is ordinarily used for the production of polyurethane foams. The foaming may be accomplished by using the low-pressure foaming machine or high-pressure foaming machine.

As mentioned above, the process of the present invention enables the production of flexible polyurethane foams having improved flame retardance and physical properties at a low production cost. In addition, the present invention provides a polyurethane foam which does not cause the problem of corrosion and contamination by the evaporated moisture from phosphorus/halogen-based flame retardant.

EXAMPLES

The invention will be described in more detail with reference to the following Examples and Comparative Examples, which are not intended to restrict the scope of the invention. In the examples, "parts" means "parts by weight per hundred polyols".

The polymer-containing polyols used in Examples and Comparative Examples are explained in Referential Examples.

Referential Example 1

At first, polyoxypropylene-ethylene triol having a molecular weight of 5000 was prepared by the addition of propylene oxide and ethylene oxide (17 wt %) to glycerin. Then, 80 parts of the polyoxypropylene-ethylene triol was charged into a reactor together with 8 parts of melamine, 26.5 parts of 80% aqueous solution of glyoxal, and 2 parts of acrylamide. Reaction was carried out at 50° C. for 2 hours. With the reactor kept at 100° C., 5 parts of acrylonitrile and 0.6 parts of $\alpha,\alpha'$-azobisisobutyronitrile (dissolved in 5 parts of styrene) were fed over 3 hours. The reaction was continued for 30 minutes. The reaction system was evacuated and dehydrated at 140° C. to remove unreacted monomers and residual water, thereby to complete the condensation reaction. Thus there was obtained a polymer-containing polyol A in the form of a white viscous liquid which has a hydroxyl number of 26.8 and a viscosity of 2070 cps.

Referential Example 2

At first, polyoxypropylene-ethylene triol having a molecular weight of 5000 was prepared by the addition of propylene oxide and ethylene oxide (17 wt %) to glycerin. Then, 75 parts of the polyoxypropylene-ethylene triol was charged into a reactor together with 14.6 parts of melamine, 65.5 parts of 35% formalin solution. Reaction was carried out at 50° C. for 2 hours. With the reactor kept at 70° C., the reaction was continued for 3 hours. The reaction system was evacuated and dehydrated at 120° C. to complete the condensation reaction. Thus there was obtained a polymer-containing polyol B in the form of a white viscous liquid which has a hydroxyl number of 28.6 and a viscosity of 2180 cps.

Examples

Polyol A obtained in Referential Example 1 was used in Examples 1 to 4, and polyol B obtained in Referential Example 2 was used in Examples 5 and 6. At first, 600 g of the polyol was weighed out into a paper cup, and then prescribed amounts of catalyst, silicone surfactant, and water were added to the polyol in the paper cup according to the formulation shown in Table 1. The components were mixed for 10 seconds using a propeller type agitator. Prescribed amounts of melamine powder and trichloromonofluoromethane were further added to the above mixture. The components were thoroughly mixed for about 1 minute. To the resulting homogeneous mixture was added a prescribed amount of tolylene diisocyanate T-80, followed by stirring at high speeds. The mixture which had just begun foam reaction was poured into a paper mold measuring 350×350×200 cm. Foaming took place within about 130 seconds (rise time), and the blowing gas bubbled.

Comparative Examples

The same procedure as in Examples was repeated to give flexible polyurethane foams, except that the polymer-containing polyol was replaced by commercial general-purpose polyol and the melamine powder was not added (in Comparative Examples 1, 7, and 9).

The same procedure as in Example 1 was repeated to give flexible polyurethane foams from polyol A, except that the melamine powder was not added (in Comparative Examples 2 to 6).

The same procedure as in Examples was repeated to give flexible polyurethane foams, except that the polymer-containing polyol was replaced by commercial general-purpose polyol (in Comparative Examples 8 and 10).

The same procedure as in Example 5 or 6 was repeated to give flexible polyurethane foams from polyol B, except that the melamine powder was not added (in Comparative Examples 11 and 12).

The flexible polyurethane foams obtained in Examples 1 to 6 and Comparative Examples 1 to 12 were tested for physical properties and flammability after ageing at normal temperature for 1 week. The results are shown in Tables 1 to 3.

TABLE 1

| | | Example No. | | | | | |
|---|---|---|---|---|---|---|---|
| | | 1 | 2 | 3 | 4 | 5 | 6 |
| Formulation (parts) | | | | | | | |
| Polyol[1] | | | | | | | |
| Polymer-containing polyol A | | 20 | 40 | 60 | 80 | — | — |
| Polymer-containing polyol B | | — | — | — | — | 40 | 80 |
| EL-828 | | 80 | 60 | 40 | 20 | 60 | 20 |
| EX-920 | | — | — | — | — | — | — |
| EX-940 | | — | — | — | — | — | — |
| (polymer content wt %) | | (5) | (10) | (15) | (20) | (10) | (20) |
| Melamine powder[2] | | 50 | 50 | 50 | 50 | 50 | 50 |
| Blowing agent | Water | 2.4 | 2.4 | 2.4 | 2.4 | 2.4 | 2.4 |
| | F-11[3] | 5 | 5 | 5 | 5 | 5 | 5 |
| Catalyst | Diethanolamine | 1.5 | 1.5 | 1.5 | 1.5 | 1.5 | 1.5 |
| | DABCO-33LV[4] | 0.2 | 0.2 | 0.2 | 0.2 | 0.2 | 0.2 |

TABLE 1-continued

| | Example No. | | | | | |
|---|---|---|---|---|---|---|
| | 1 | 2 | 3 | 4 | 5 | 6 |
| NIAX A-1[5] | 0.07 | 0.07 | 0.07 | 0.07 | 0.07 | 0.07 |
| Stannous octoate | 0.1 | 0.1 | 0.1 | 0.1 | 0.1 | 0.1 |
| Silicone L-5309[6] | 1.4 | 1.4 | 1.4 | 1.4 | 1.4 | 1.4 |
| Isocyanate | | | | | | |
| T-80[7] | 33.2 | 33.0 | 32.8 | 32.5 | 33.0 | 32.5 |
| (NCO index) | (105) | (105) | (105) | (105) | (105) | (105) |
| Physical properties of foam[8] | | | | | | |
| Density (g/cm$^3$) | 0.0542 | 0.0539 | 0.0560 | 0.0590 | 0.0538 | 0.0545 |
| Compressive strength (CDF g/cm$^3$) | | | | | | |
| 25% | 0.0471 | 0.0467 | 0.0464 | 0.0622 | 0.0483 | 0.0521 |
| 65% | 0.161 | 0.184 | 0.200 | 0.272 | 0.203 | 0.260 |
| Tensile properties | | | | | | |
| Elongation (%) | 73 | 63 | 68 | 57 | 58 | 54 |
| Strength (kg/cm$^2$) | 0.63 | 0.69 | 0.88 | 0.88 | 0.72 | 0.84 |
| Ball rebound resilience (%) | 56 | 55 | 55 | 45 | 54 | 48 |
| Flammability performance | | | | | | |
| Oxygen index (%) | 32.5 | 33.3 | 32.5 | 34.2 | 31.8 | 33.6 |
| Cal. 117 | | | | | | |
| Average afterflame (sec) | 0 | 0 | 0 | 0 | 0 | 0 |
| Average afterglow (sec) | 0 | 0 | 0 | 0 | 0 | 0 |
| Average char length (mm) | 62 | 72 | 67 | 73 | 74 | 68 |
| Maximum char length (mm) | 70 | 80 | 70 | 90 | 75 | 70 |
| Judgement | pass | pass | pass | pass | pass | pass |

TABLE 2

| | Comparative Example No. | | | | | |
|---|---|---|---|---|---|---|
| | 1 | 2 | 3 | 4 | 5 | 6 |
| Formulation (parts) | | | | | | |
| Polyol[1] | | | | | | |
| Polymer-containing polyol A | 0 | 20 | 40 | 60 | 80 | 100 |
| Polymer-containing polyol B | — | — | — | — | — | — |
| EL-828 | 100 | 80 | 60 | 40 | 20 | 0 |
| EX-920 | — | — | — | — | — | — |
| EX-940 | — | — | — | — | — | — |
| (polymer content wt %) | (0) | (5) | (10) | (15) | (20) | (25) |
| Melamine powder[2] | — | — | — | — | — | — |
| Blowing agent  Water | 2.4 | 2.4 | 2.4 | 2.4 | 2.4 | 2.4 |
| F-11[3] | 5 | 5 | 5 | 5 | 5 | 5 |
| Catalyst  Diethanolamine | 1.5 | 1.5 | 1.5 | 1.5 | 1.5 | 1.5 |
| DABCO-33LV[4] | 0.2 | 0.2 | 0.2 | 0.2 | 0.2 | 0.2 |
| NIAX A-1[5] | 0.07 | 0.07 | 0.07 | 0.07 | 0.07 | 0.07 |
| Stannous octoate | 0.1 | 0.1 | 0.1 | 0.1 | 0.1 | 0.1 |
| Silicone L-5309[6] | 1.4 | 1.4 | 1.4 | 1.4 | 1.4 | 1.4 |
| Isocyanate | | | | | | |
| T-80[7] | 33.5 | 33.2 | 33.0 | 32.8 | 32.5 | 32.5 |
| (NCO index) | (105) | (105) | (105) | (105) | (105) | (105) |
| Physical properties of foam[8] | | | | | | |
| Density (g/cm$^3$) | 0.0337 | 0.0339 | 0.0379 | 0.0384 | 0.0376 | 0.0561 |
| Compressive strength (CDF g/cm$^3$) | | | | | | |
| 25% | 0.0102 | 0.0142 | 0.0213 | 0.0231 | 0.0222 | 0.0310 |
| 65% | 0.0356 | 0.0280 | 0.0587 | 0.0671 | 0.0667 | 0.0631 |
| Tensile properties | | | | | | |
| Elongation (%) | 110 | 160 | 150 | 130 | 107 | 63 |
| Strength (kg/cm$^2$) | 0.69 | 0.88 | 1.09 | 1.08 | 1.07 | 0.98 |
| Ball rebound resilience (%) | 54 | 59 | 55 | 61 | 54 | 30 |
| Flammability performance | | | | | | |
| Oxygen index (%) | 21.1 | 22.8 | 24.6 | 27.2 | 28.1 | 25.0 |
| Cal. 117 | | | | | | |
| Average afterflame (sec) | 0 | 0 | 0 | 0 | 0 | 0 |
| Average afterglow (sec) | 0 | 0 | 0 | 0 | 0 | 0 |
| Average char length (mm) | burn | 90 | 80 | 67 | 62 | 63 |
| Maximum char length (mm) | burn | 90 | 85 | 70 | 70 | 70 |
| Judgement | fail | pass | pass | pass | pass | pass |

TABLE 3

| | Comparative Example No. | | | | | |
|---|---|---|---|---|---|---|
| | 7 | 8 | 9 | 10 | 11 | 12 |
| Formulation (parts) | | | | | | |
| Polyol[1] | | | | | | |
| Polymer-containing polyol A | — | — | — | — | — | — |

TABLE 3-continued

|  |  | Comparative Example No. | | | | | |
|---|---|---|---|---|---|---|---|
|  |  | 7 | 8 | 9 | 10 | 11 | 12 |
| Polymer-containing polyol B |  | — | — | — | — | 40 | 80 |
| EL-828 |  | 50 | 50 | 50 | 50 | 60 | 20 |
| EX-920 |  | 50 | 50 | — | — | — | — |
| EX-940 |  | — | — | 50 | 50 | — | — |
| (polymer content wt %) |  | — | — | — | — | (10) | (20) |
| Melamine powder[2] |  | — | 50 | — | 50 | — | — |
| Blowing agent | Water | 2.4 | 2.4 | 2.4 | 2.4 | 2.4 | 2.4 |
|  | F-11[3] | 5 | 5 | 5 | 5 | 5 | 5 |
| Catalyst | Diethanolamine | 1.5 | 1.5 | 1.5 | 1.5 | 1.5 | 1.5 |
|  | DABCO-33LV[4] | 0.2 | 0.2 | 0.2 | 0.2 | 0.2 | 0.2 |
|  | NIAX A-1[5] | 0.07 | 0.07 | 0.07 | 0.07 | 0.07 | 0.07 |
|  | Stannous octoate | 0.1 | 0.1 | 0.1 | 0.1 | 0.1 | 0.1 |
| Silicone L-5309[6] |  | 1.4 | 1.4 | 1.4 | 1.4 | 1.4 | 1.4 |
| Isocyanate |  |  |  |  |  |  |  |
| T-80[7] |  | 32.7 | 32.7 | 32.8 | 32.8 | 33.0 | 32.5 |
| (NCO index) |  | (105) | (105) | (105) | (105) | (105) | (105) |
| Physical properties of foam[8] |  |  |  |  |  |  |  |
| Density (g/cm$^3$) |  | 0.0400 | 0.0544 | 0.0420 | 0.0541 | 0.0372 | 0.0381 |
| Compressive strength (CDF g/cm$^3$) |  |  |  |  |  |  |  |
| 25% |  | 0.0258 | 0.0533 | 0.0227 | 0.0497 | 0.0224 | 0.0236 |
| 65% |  | 0.0756 | 0.148 | 0.0791 | 0.176 | 0.0566 | 0.0621 |
| Tensile properties |  |  |  |  |  |  |  |
| Elongation (%) |  | 110 | 68 | 127 | 62 | 142 | 101 |
| Strength (kg/cm$^2$) |  | 1.09 | 1.16 | 1.06 | 0.69 | 1.03 | 1.05 |
| Ball rebound resilience (%) |  | 62 | 54 | 64 | 56 | 55 | 52 |
| Flammability performance |  |  |  |  |  |  |  |
| Oxygen index (%) |  | 19.3 | 25.4 | 20.2 | 25.4 | 22.7 | 27.6 |
| Cal. 117 |  |  |  |  |  |  |  |
| Average afterflame (sec) |  | — | 0 | — | 0 | 0 | 0 |
| Average afterglow (sec) |  | — | 0 | — | 0 | 0 | 0 |
| Average char length (mm) |  | burn | 63 | burn | 85 | 77 | 71 |
| Maximum char length (mm) |  | burn | 75 | burn | 90 | 80 | 75 |
| Judgement |  | fail | pass | fail | pass | pass | pass |

Note to Tables 1 to 3.
[1]Polymer-containing polyol A obtained in Referential Example 1. Polymer content: 25 wt % Polymer-containing polyol B obtained in Referential Example 2. Polymer content: 25 wt % EL-828, EX-920, EX-940: commercial polyols (made by Asahi Glass Co., Ltd.) EL-828: polyoxypolypropylene polyether polyol (OH number: 34 mg KOH/g) EX-920: polymer polyol grafted with acrylonitrile and styrene (OH number: 25 mg KOH/g) EX-940: polymer polyol grafted with acrylonitrile and styrene (OH number: 28 mg KOH/g)
[2]made by Nissan Chemical Co., Ltd.
[3]trichloromonofluoromethane made by Asahi Glass Co., Ltd.
[4]33% DPG solution of triethylenediamine made by Sankyo Airproducts Co., Ltd.
[5]70% DPG solution of bis(2-dimethyl aminoethyl)ether made by Union Carbide Corporation.
[6]silicone surfactant made by Union Carbide Corporation.
[7]2,4-tolylene diisocyanate/2,6-tolylene diisocyanate (weight proportion 8/2) made by Takeda Yakuhin Kogyo Co., Ltd.
[8]density: JIS K-6401 compressive strength: JIS K-6301 tensile properties: JIS K-6301 ball rebound resilience: JIS K-6401 flammability: California Bulletine No. 117 (Cal. 117)

It is noted from Tables 1 to 3 that the flexible polyurethane foams in Examples 1 to 6 made from the polymer-containing polyol and melamine powder are 2- to 3-fold higher in 25% compressive strength and 3- to 5-fold higher in 65% compressive strength than the flexible polyurethane foams in Comparative Examples 2 to 6, 11, and 12 which do not contain melamine powder. This indicates that melamine powder greatly contributes to the improvement of compressive strength even when their difference in density is taken into account. It is also noted that in the case where commercial polyol is used in place of the polymer-containing polyol, the polyurethane foams containing melamine powder in Comparative Examples 8 and 10 have only twice as high compressive strength as the polyurethane foams containing no melamine powder in Comparative Examples 7 and 9. This indicates that the combined use of the polymer-containing polyol and melamine powder produces their synergistic effect, providing polyurethane foams having a high compressive strength, particularly 65% compressive strength.

The polyurethane foams made from the polymer-containing polyol but containing no melamine powder in Comparative Examples 2 to 6 are superior in flame retardance to the polyurethane foams made from a commercial polyol in Comparative Example 1. The former has a higher oxygen index than the latter and the former passed the California No. 117 test. The polyurethane foams made from a commercial polyol and melamine powder in Comparative Examples 8 and 10 are superior in flame retardance to the polyurethane foams containing no melamine powder in Comparative Examples 7 and 9. However, the polyurethane foams in Comparative Examples 2 to 6 have an oxygen index of from 22 to 28, and the polyurethane foams in Comparative Examples 8 and 10 have an oxygen index of 25. In other words, they do not have a high performance of flame retardance represented by an oxygen index in excess of 30. The polyurethane foams made from the polymer-containing polyol and melamine powder in Examples from 1 to 6 have oxygen indices of from 32 to 34, which are much higher than the oxygen index of 30. They are comparable to phenolic foams designated as quasi in combustible (JIS K1321) which have an oxygen index of 35.

Although the polyurethane foams in Comparative Examples 2 to 6, 8, and 10 passed the California No. 117 test, they should not be regarded as flame-retardant according to this test alone, because they pass this test if the flame does not spread easily. By contrast, the oxygen index method is free of such a disadvantage and permits one to make a definite judgement on the flame retardance of polyurethane foams. Therefore, the polyurethane foams according to the present invention in Examples 1 to 6 are regarded as having a high performance of flame retardance in view of their high oxygen indices.

Moreover, the polyurethane foams according to the present invention in Examples 1 to 6 are suitable for practical use in view of their good physical properties.

What is claimed is:

1. An improved process for producing a flexible polyurethane foam by reacting a polyhydroxy compound and a polyisocyanate compound in the presence of a blowing agent, wherein the improvement comprises using a polyhydroxy compound having an aldehyde condensation polymer dispersed therein, said polymer having been formed by polycondensation of an aldehyde and a compound selected from the group consisting of a polyamine compound, an aromatic amine and phenol in said polyhydroxy compound, and adding a melamine powder.

2. The process of claim 1 wherein the amount of the aldehyde condensation polymer in the polyghydroxy compound is in the range of from 5 to 30% by weight of the total amount of the polyhydroxy compound.

3. The process of claim 1 wherein the amount of the melamine powder is in the range of from 5 to 100 parts by weight for 100 parts by weight o the polyhydroxy compound.

4. The process of claim 1 wherein the polyisocyanate compound is used in an amount of from 0.95 to 1.2 equivalents for polyhydroxy compound.

5. The process of claim 1 wherein the polyhydroxy compound is selected from a saturated polyol, an unsaturated polyol or an unsaturated polyether-ester polyol.

6. The process of claim 1 wherein the polyhydroxy compound is a polyether polyol having a molecular weight in the range of from 1000 to 100000.

7. The process of claim 1 wherein the polyhydroxy compound is a polyether polyol having a molecular weight in the range of from 3000 to 7000.

8. The process of claim 1 wherein the aldehyde is selected from formaldehyde, acetaldehyde, paraformaldehyde, glyoxal or hexamethylenetetramine.

9. The process of claim 1 wherein the aldehyde condensation polymer is formed by polycondensation of an aldehyde and a compound selected from urea, melamine, benzoguanamine, aniline, diaminobenzene, diaminodiphenylmethane, phenol, cresol or resorcinol.

10. The process of claim 1 wherein the polyisocyanate compound is selected from an aromatic isocyanate, an alicyclic isocyanate or an aliphatic isocyanate.

11. The process of claim 1 wherein the polyisocyanate compound is selected from tolylene diisocyanate, diphenylmethane diisocyanate, naphthalene diisocyanate, isophorone diisocyanate, hydrogenated tolylene diisocyanate or hexamethylene diisocyanate.

12. The process of claim 1 wherein the blowing agent is selected from water, carbon dioxide, trichloromonofluoromethane, methylene dichloride or pentane.

13. The process of claim 1 wherein the produced flexible polyurethane foam has a density of from 0.01 to 0.10 gr/cm$^3$.

14. The process of claim 1 wherein the produced flexible polyurethane foam has a density of from 0.02 to 0.06 gr/cm$^3$.

* * * * *